US012573760B2

(12) United States Patent
Niu et al.

(10) Patent No.: US 12,573,760 B2
(45) Date of Patent: Mar. 10, 2026

(54) ANTENNA TUNING CIRCUIT

(71) Applicant: Qorvo US, Inc., Greensboro, NC (US)

(72) Inventors: Chenhui Niu, San Jose, CA (US); David Edward Reed, Calhan, CO (US)

(73) Assignee: Qorvo US, Inc., Greensboro, NC (US)

( * ) Notice: Subject to any disclaimer, the term of this patent is extended or adjusted under 35 U.S.C. 154(b) by 378 days.

(21) Appl. No.: 18/311,959

(22) Filed: May 4, 2023

(65) Prior Publication Data

US 2023/0369767 A1 Nov. 16, 2023

Related U.S. Application Data

(60) Provisional application No. 63/389,166, filed on Jul. 14, 2022, provisional application No. 63/340,991, filed on May 12, 2022.

(51) Int. Cl.
*H01Q 9/04* (2006.01)
*H01Q 5/335* (2015.01)

(52) U.S. Cl.
CPC ........... *H01Q 9/0442* (2013.01); *H01Q 5/335* (2015.01)

(58) Field of Classification Search
CPC ......... H01Q 5/335; H01Q 9/0442; H01Q 9/04
See application file for complete search history.

(56) References Cited

U.S. PATENT DOCUMENTS

| | | | |
|---|---|---|---|
| 4,095,186 | A | 6/1978 | Vesel |
| 5,187,719 | A | 2/1993 | Birgenheier et al. |
| 6,859,761 | B2 | 2/2005 | Bensky et al. |
| 8,737,929 | B2 | 5/2014 | Cohen et al. |
| 8,869,612 | B2 | 10/2014 | Chen et al. |
| 9,225,507 | B1 | 12/2015 | Lye et al. |
| 9,392,558 | B2 | 7/2016 | See et al. |
| 9,793,610 | B2 | 10/2017 | Wehrmann et al. |
| 10,056,888 | B2 | 8/2018 | Iversen |
| 10,599,601 | B1 | 3/2020 | Ngo et al. |
| 10,680,574 | B1 | 6/2020 | Hrivnak et al. |
| 11,711,107 | B2 | 7/2023 | Iversen et al. |
| 2007/0296396 | A1 | 12/2007 | Nakahira |
| 2012/0232471 | A1 | 9/2012 | Chen et al. |

(Continued)

OTHER PUBLICATIONS

Yeo, K.S. et al., "Non-sequential linear CMOS phase detector for CDR applications," IEEE Proceedings-Circuits, Devices and Systems, vol. 152, No. 6, Dec. 2005, pp. 667-672.

(Continued)

*Primary Examiner* — Tuan H Nguyen
(74) *Attorney, Agent, or Firm* — Withrow & Terranova, P.L.L.C.

(57) ABSTRACT

An antenna tuning circuit is disclosed. The antenna tuning circuit is configured to make multiple estimates on an antenna impedance at an antenna port and determine an optimum tuning state for antenna tuning based on the antenna impedance estimates. The antenna tuning circuit may be further configured according to various embodiments of the present disclosure to minimize impedance estimation error, reduce magnitude and/or phase disturbance during antenna tuning, and extrapolate antenna impedance estimates for both transmit and receive frequencies. As a result, the antenna tuning circuit can accomplish autonomous antenna tuning optimization to thereby improve transmit and receive performance in a wireless communication device.

20 Claims, 10 Drawing Sheets

(56) References Cited

U.S. PATENT DOCUMENTS

| | | | |
|---|---|---|---|
| 2016/0226429 A1 | 8/2016 | Lee | |
| 2017/0346178 A1* | 11/2017 | Shi | H04B 17/12 |
| 2018/0262257 A1* | 9/2018 | Greene | H04B 1/0458 |
| 2021/0218430 A1 | 7/2021 | Han et al. | |
| 2021/0407771 A1 | 12/2021 | Funk et al. | |

OTHER PUBLICATIONS

Notice of Allowance for U.S. Appl. No. 15/431,933, mailed Apr. 27, 2018, 9 pages.
Notice of Allowance for U.S. Appl. No. 17/454,437, mailed Mar. 7, 2023, 9 pages.
Extended European Search Report for European Patent Application No. 23172292.7, mailed Oct. 10, 2023, 8 pages.

* cited by examiner

| | |
|---|---|
| 1 & 2 | INDUCTIVE REACTANCE REGION |
| 3 & 4 | CAPACITIVE REACTANCE REGION |
| 2 & 3 | HIGH IMPEDANCE REGION |
| 1 & 4 | LOW IMPEDANCE REGION |

COMPLEX TUNER TRANSFER FUNCTION 50

ANTENNA TUNING CIRCUIT

RELATED APPLICATIONS

This application claims the benefit of U.S. provisional patent application Ser. No. 63/340,991, filed on May 12, 2022, and U.S. provisional patent application Ser. No. 63/389,166, filed on Jul. 14, 2022, the disclosures of which are hereby incorporated herein by reference in their entireties.

FIELD OF THE DISCLOSURE

The technology of the disclosure relates generally to antenna tuning.

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

In general, to achieve optimal antenna performance in a wireless communication device, an impedance of an antenna is matched to an impedance of the line conveying a signal to be transmitted. As the frequencies have increased, the antennas associated with the mobile communication devices have become more sensitive. Accordingly, when there are changes in the environment (e.g., proximity to organic material (e.g., proximity to a user's hand, head, or body) or being placed on a metal surface) a change in the impedance of the antenna caused by such environmental change may have a disproportionate impact on performance due to an impedance mismatch. Minimizing the impact of such dynamic impedance variations has proven challenging and there remains room for improving impedance matching in dynamic environments.

SUMMARY

Aspects disclosed in the detailed description include an antenna tuning circuit. The antenna tuning circuit is configured to make multiple estimates on an antenna impedance at an antenna port and determine an optimum tuning state for antenna tuning based on the antenna impedance estimates. The antenna tuning circuit may be further configured according to various embodiments of the present disclosure to minimize impedance estimation error, reduce magnitude and/or phase disturbance during antenna tuning, and extrapolate antenna impedance estimates for both transmit and receive frequencies. As a result, the antenna tuning circuit can accomplish autonomous antenna tuning optimization to thereby improve transmit and receive performance in a wireless communication device.

In one aspect, an antenna tuning circuit is provided. The antenna tuning circuit includes an impedance tuner circuit. The impedance tuner circuit is coupled to an antenna port. The antenna tuning circuit also includes a control circuit. The control circuit is configured to receive one or more input impedances measured at an input of the impedance tuner circuit. Each of the one or more measured input impedances corresponds to a respective one of one or more selected tuning states among multiple tuning states associated with the impedance tuner circuit. The control circuit is also configured to make one or more estimates of an antenna impedance presenting at the antenna port based on the one or more measured input impedances, respectively. The control circuit is also configured to determine an optimum tuning state among the multiple tuning states based on the one or more estimates of the antenna impedance. The control circuit is also configured to configure the impedance tuner circuit based on the determined optimum tuning state to thereby match the antenna impedance presenting at the antenna port.

In another aspect, a method for performing closed loop antenna tuning is provided. The method includes measuring one or more input impedances each corresponding to a respective one of one or more selected tuning states among multiple tuning states. The method also includes making one or more estimates of an antenna impedance based on the one or more measured input impedances, respectively. The method also includes determining an optimum tuning state among the multiple tuning states based on the one or more estimates of the antenna impedance. The method also includes matching the antenna impedance based on the determined optimum tuning state.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

Figure 1:
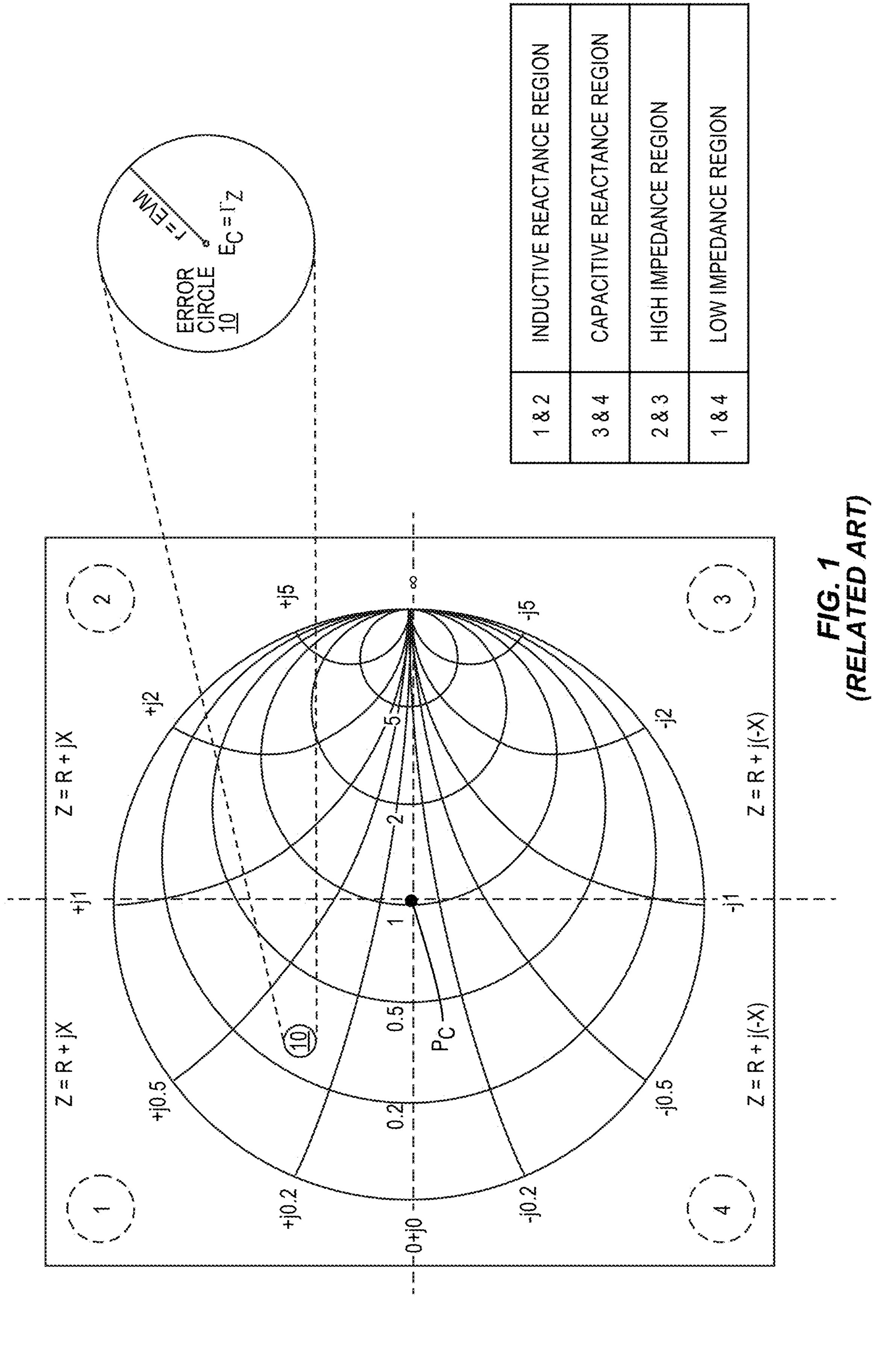
FIG. 1 (RELATED ART)
FIG. 1 is a graphic diagram providing an exemplary illustration of the well-known Smith Chart.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term “and/or” includes any and all combinations of one or more of the associated listed items.

It will be understood that when an element such as a layer, region, or substrate is referred to as being “on” or extending “onto” another element, it can be directly on or extend directly onto the other element or intervening elements may also be present. In contrast, when an element is referred to as being “directly on” or extending “directly onto” another element, there are no intervening elements present. Likewise, it will be understood that when an element such as a layer, region, or substrate is referred to as being “over” or extending “over” another element, it can be directly over or extend directly over the other element or intervening elements may also be present. In contrast, when an element is referred to as being “directly over” or extending “directly over” another element, there are no intervening elements present. It will also be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present.

Relative terms such as “below” or “above” or “upper” or “lower” or “horizontal” or “vertical” may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms “a,” “an,” and “the” are intended to include the plural forms as well, unless the context clearly indicates otherwise. It will be further understood that the terms “comprises,” “comprising,” “includes,” and/or “including” when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to an antenna tuning circuit. The antenna tuning circuit is configured to make multiple estimates on an antenna impedance at an antenna port and determine an optimum tuning state for antenna tuning based on the antenna impedance estimates. The antenna tuning circuit may be further configured according to various embodiments of the present disclosure to minimize impedance estimation error, reduce magnitude and/or phase disturbance during antenna tuning, and extrapolate antenna impedance estimates for both transmit and receive frequencies. As a result, the antenna tuning circuit can accomplish autonomous antenna tuning optimization to thereby improve transmit and receive performance in a wireless communication device.

Figure 2:
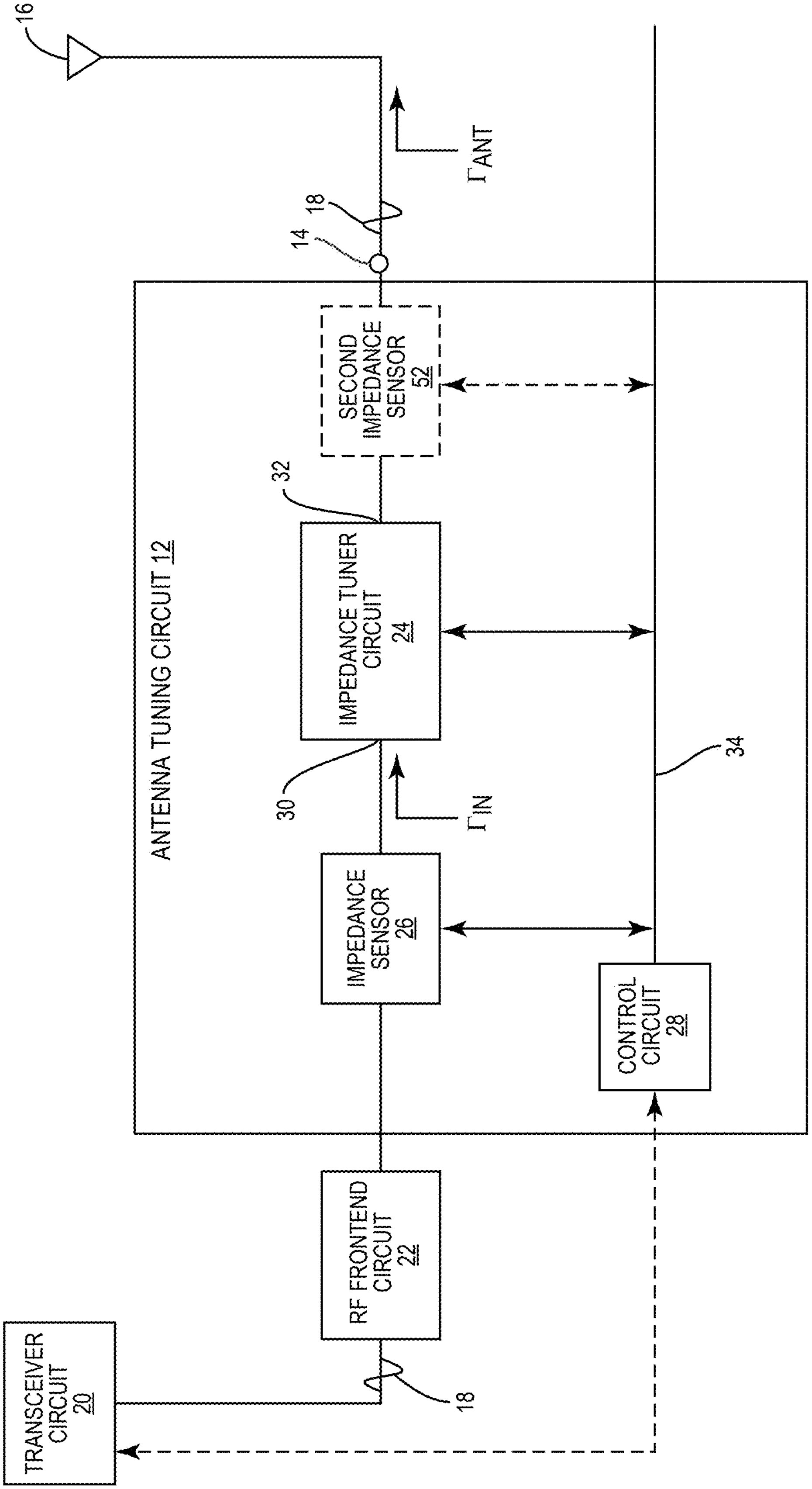
FIG. 2 is a schematic diagram of an exemplary antenna tuning circuit configured according to an embodiment of the present disclosure to perform closed loop antenna tuning.

Before discussing the antenna tuning circuit of the present disclosure, starting at FIG. 2, a brief discussion of the well-known Smith Chart is first provided with reference to FIG. 1 to help define some critical terminologies in the context of the present disclosure.

FIG. 1 is a graphic diagram providing an exemplary illustration of the well-known Smith Chart. The Smith Chart may be divided into four quadrants 1, 2, 3, and 4. Among them, quadrants 1 and 2 represent an inductive reactance region, in which an impedance Z can be expressed as R+jX. Understandably, R represents a real resistance and X represents an inductive reactance. In contrast, quadrants 3 and 4 represent a capacitive reactance region, in which the impedance Z can be expressed as R+j(−X). Understandably, R represents the real resistance and −X represents a capacitive reactance.

Further, quadrants 2 and 3 represent a high impedance region as they correspond to the real resistance R that is higher than a normalized resistance represented by a center point $P_C$. In contrast, quadrants 1 and 4 represent a low impedance region as they correspond to the real resistance R that is lower than the nominal resistance represented by the center point $P_C$.

In the context of the present disclosure, an impedance $\Gamma_Z$ can be a measured impedance or an estimated impedance. Since the measured impedance can be subject to a measurement error and the estimated impedance can be subject to an estimation error, the impedance $\Gamma_Z$ is therefore presented as an error distribution circle 10 (a.k.a. error circle) on the Smith Chart. As shown in FIG. 1, the error distribution circle 10 is defined by a center $E_C$ representing the measured/estimated impedance $\Gamma_Z$ and a radius r corresponding to an error vector magnitude (EVM) of the measured/estimated impedance $\Gamma_Z$. The term “error distribution circle” as defined herein, will be frequently referenced in various embodiments of the present disclosure, which are discussed next.

FIG. 2 is a schematic diagram of an exemplary antenna tuning circuit 12 configured according to an embodiment of the present disclosure to perform closed loop antenna tuning. The antenna tuning circuit 12 is coupled to an antenna port 14, which is further coupled to an antenna circuit 16 (e.g., an antenna array). The antenna circuit 16 is configured to emit a radio frequency (RF) transmit signal 18. In an embodiment, the RF transmit signal 18 may be generated by a transceiver circuit 20 and provided to the antenna tuning circuit 12 via an RF frontend circuit 22. In a non-limiting example, the RF frontend circuit 22 can include such active/passive circuits as a power amplifier(s), an RF filter circuit(s), and a switching circuit(s), which are not shown herein for the sake of simplicity.

The antenna circuit 16 presents an antenna impedance $\Gamma_{ANT}$ at the antenna port 14. Notably, the antenna impedance $\Gamma_{ANT}$ can fluctuate from time to time due to modulation bandwidth, RF frequency, and/or power variation of the RF signal 18. As such, it is necessary to accurately determine and match the antenna impedance $\Gamma_{ANT}$ at the antenna port 14 to avoid potential distortion in the RF signal 18 resulting from, for example, signal reflection.

In this regard, the antenna tuning circuit 12 includes an impedance tuner circuit 24. The impedance tuner circuit 24 is coupled to the antenna port 14 and can be dynamically tuned to match the antenna impedance $\Gamma_{ANT}$ at the antenna port 14. More specifically, the antenna tuning circuit 12 can make multiple estimates of the antenna impedance $\Gamma_{ANT}$ and determine an optimum tuning state for antenna tuning based on the estimates of the antenna impedance $\Gamma_{ANT}$. Accordingly, the antenna tuning circuit 12 can dynamically tune the impedance tuner circuit 24 based on the determined optimum tuner state to thereby provide an optimal match to the antenna impedance $\Gamma_{ANT}$ presenting at the antenna port 14.

In a non-limiting example, the impedance tuner circuit 24 can include a combination of tunable capacitors, resistors, and/or inductors. These tunable capacitors, resistors, and/or inductors may be adjusted individually or collectively based on a specific tuning state. In an embodiment, the tuning state may be a digital bitmap having multiple binary bits. Each of the tunable capacitors, resistors, and/or inductors may be associated with one or more of the binary bits in the bit map. For example, the impedance tuner circuit 24 can include one tunable capacitor, one tunable resistor, and one tunable inductor. In this regard, if the tuning state is a six-digit digital bitmap, then each of the tunable capacitor, tunable resistor, and tunable inductor can be associated with a respective two binary bits in the digital bitmap. Accordingly, each of the tunable capacitor, the tunable resistor, and the tunable inductor can have four tunable values that correspond to binary values "00," "01," "10," and "11." In this example, there can be sixty-four different tuner state combinations for tuning the tunable capacitor, the tunable resistor, and the tunable inductor. Understandably, as more tunable capacitors, resistors, and/or inductors are provided in the impedance tuner circuit 24, the number of tuning states can grow exponentially.

The antenna tuning circuit 12 also includes an impedance sensor 26 and a control circuit 28. The impedance sensor 26 is coupled to an input 30 of the impedance tuner circuit 24. The antenna port 14, on the other hand, is coupled to an output 32 of the impedance tuner circuit 24. The control circuit 28, which can be a field-programmable gate array (FPGA), as an example, is coupled to the impedance sensor 26 and the impedance tuner circuit 24 via a single-wire bus 34. In a non-limiting example, the control circuit 28 can include storage memories (not shown) for storing all the tuning states of the impedance tuner circuit 24.

In an embodiment, the impedance sensor 26 is configured to measure an input impedance $\Gamma_{IN}$ presenting at the input of the impedance tuner circuit 24. In a non-limiting example, the impedance tuner circuit 24 can be modeled by a transfer function of a well-known 2-port network, a relationship between the input impedance $\Gamma_{IN}$ presenting at the input of the impedance tuner circuit 24 and the antenna impedance $\Gamma_{ANT}$ presenting at the output 32 of the impedance tuner circuit 24 can be established as in equations (Eq. 1.1 and 1.2) below.

$$\Gamma_{IN} = S_{11} + \frac{S_{12} * S_{21} * \Gamma_{ANT}}{1 - S_{22} * \Gamma_{ANT}} \quad \text{(Eq. 1.1)}$$

$$\Gamma_{ANT} = \frac{\Gamma_{ANT} - S_{11}}{S_{22} * \Gamma_{ANT} + S_{12} * S_{21} - S_{11} * S_{22}} \quad \text{(Eq. 1.2)}$$

Figure 3:
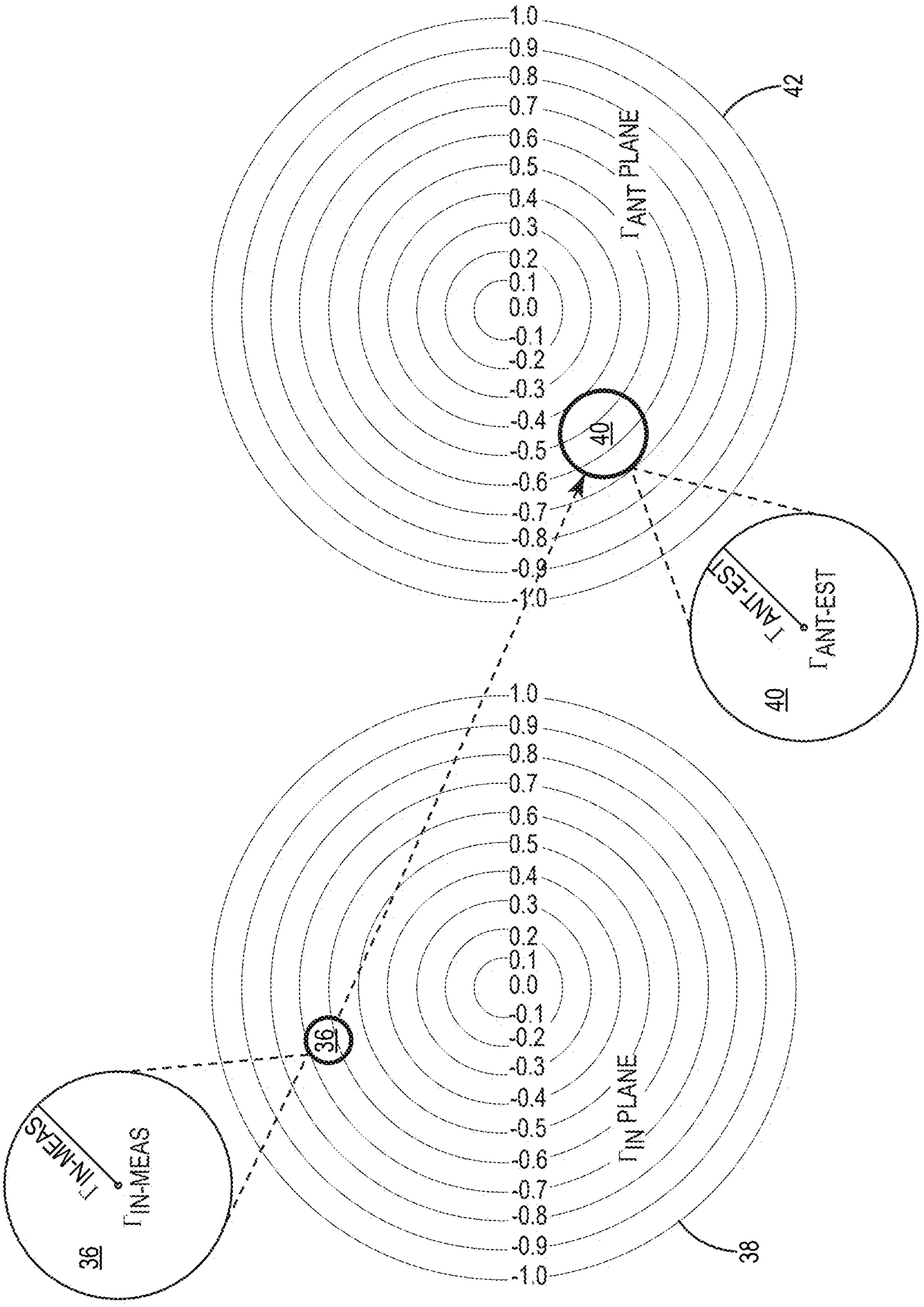
FIG. 3 is a graphic diagram illustrating an algorithm for estimating an antenna impedance based on a measured input impedance.

Given the relationship between the input impedance $\Gamma_{IN}$ and the antenna impedance $\Gamma_{ANT}$, the control circuit 28 can then estimate the antenna impedance $\Gamma_{ANT}$ at the output 32 of the impedance tuner circuit 24 based on the input impedance $\Gamma_{IN}$ measured at the input 30 of the impedance tuner circuit 24. FIG. 3 is a graphic diagram illustrating an algorithm for estimating the antenna impedance $\Gamma_{ANT}$ based on the measured input impedance $\Gamma_{IN}$.

As the Mobius transformation M(z)=(az+b)/(cz+d) can be written as a matrix $$M = \begin{bmatrix} a & b \\ c & d \end{bmatrix},$$

the equations (Eq. 1.1 and 1.2) can be rewritten as equations (Eq. 2.1 and 2.2), respectively.

$$\Gamma_{IN} = \begin{bmatrix} -\det(S) & S_{11} \\ -S_{22} & 1 \end{bmatrix} \quad \text{(Eq. 2.1)}$$

$$\Gamma_{ANT} = \begin{bmatrix} 1 & -S_{11} \\ S_{22} & -\det(S) \end{bmatrix} \quad \text{(Eq. 2.2)}$$

Accordingly, when a measurement of the input impedance $\Gamma_{IN}$ (denoted as "$\Gamma_{IN\text{-}MEAS}$") is made by the impedance sensor 26, an error distribution of the measured input impedance $\Gamma_{IN\text{-}MEAS}$ can be shown as a measurement error circle 36 on a $\Gamma_{IN}$ plane 38 (e.g., a Smith Chart). The measurement error circle 36 is centered at the at the measured input impedance $\Gamma_{IN\text{-}MEAS}$ and has a radius $\Gamma_{IN\text{-}MEAS}$ corresponding to an EVM of the input impedance $\Gamma_{IN}$. The input impedance $\Gamma_{IN}$ is assumed to be uniformly spread in the measurement error circle 36.

To produce an estimation of the antenna impedance $\Gamma_{ANT}$ (denoted as "$\Gamma_{ANT\text{-}MEAS}$"), the measurement error circle 36 can be converted to an estimation error circle 40 on a $\Gamma_{ANT}$ plane 42 (e.g., a Smith Chart). The estimation error circle 40 is centered at the estimated antenna impedance $\Gamma_{ANT\text{-}EST}$ and has a radius $\Gamma_{ANT\text{-}EST}$ as expressed in equations (Eq. 3.1, 3.2, and 3.3) below.

$$\Gamma_{ANT\text{-}EST} = \frac{\Gamma_P - S_{11}}{S_{22} * \Gamma_P - \det(S)} \quad \text{(Eq. 3.1)}$$

$$r_{ANT\text{-}EST} = \frac{|S_{12} \times S_{21}| \times r_{IN\text{-}MEAS}}{|S_{22} * \Gamma_{IN\text{-}MEAS} - \det(S)|^2 - |S_{22}|^2 * r_{IN\text{-}MEAS}} \quad \text{(Eq. 3.2)}$$

$$\Gamma_P = \Gamma_{IN\text{-}MEAS} - \frac{r_{IN\text{-}MEAS^2}}{\text{conjugate}\left(-\frac{\det(S)}{S_{22}} + \Gamma_{IN\text{-}MEAS}\right)} \quad \text{(Eq. 3.3)}$$

As discussed above, the control circuit 28 can extrapolate the estimated antenna impedance $\Gamma_{ANT\text{-}MEAS}$ from the measured input impedance $\Gamma_{IN\text{-}MEAS}$. Accordingly, the control circuit 28 can control the impedance tuner circuit 24 to match the estimated antenna impedance $\Gamma_{ANT-MEAS}$. In this regard, the antenna tuning circuit 12 can perform closed loop antenna tuning to match the antenna impedance $\Gamma_{ANT}$ as much as possible to thereby improve transmit and receive performance in a wireless communication device.

Figure 4:
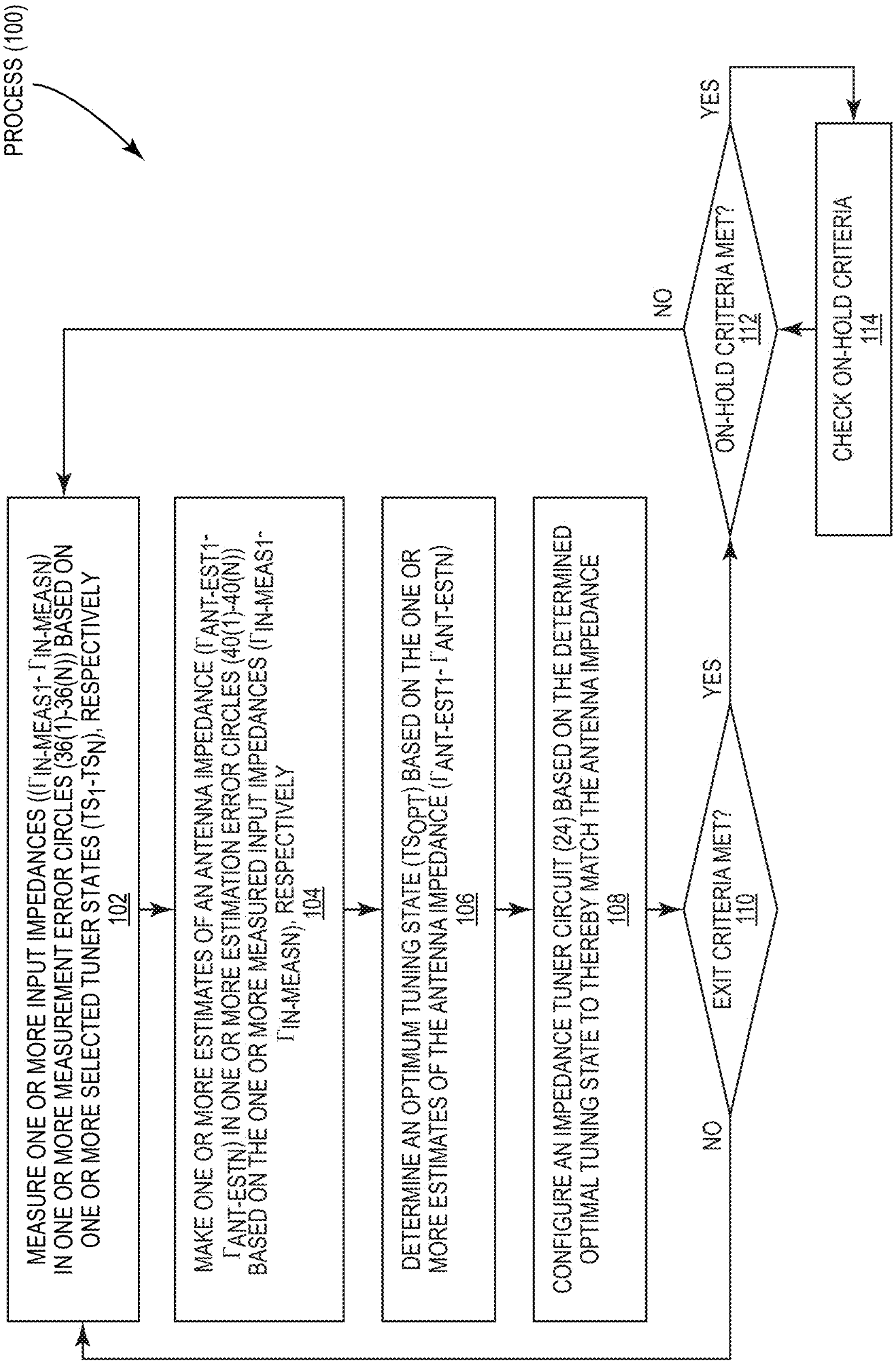
FIG. 4 is a flowchart of an exemplary process that can be employed by the closed loop antenna tuning circuit of FIG. 2 to perform the closed loop antenna tuning.

In an embodiment, the antenna tuning circuit 12 may be configured to perform closed loop antenna tuning based on a process. In this regard, FIG. 4 is a flowchart of an exemplary process 100 that can be employed by the antenna tuning circuit 12 of FIG. 2 to perform the closed loop antenna tuning. Elements in FIG. 2 are referenced in the process 100 and will not be re-described herein.

According to the process 100, the impedance sensor 26 is further configured to perform one or more measurements (denoted as "$\Gamma_{IN-MEAS1}$-$\Gamma_{IN-MEASN}$") of the input impedance $\Gamma_{IN}$ at the input 30 of the impedance tuner circuit 24 (step 102). Each of the input impedances $\Gamma_{IN-MEAS1}$-$\Gamma_{IN-MEASN}$ is measured by setting the impedance tuner circuit 24 to a respective one of one or more selected tuner states $TS_1$-$TS_N$ among all the tuner states associated with the impedance tuner circuit 24. In other words, the input impedances $\Gamma_{IN-MEAS1}$-$\Gamma_{IN-MEASN}$ may be measured based on a selected subset of the tuner states associated with the impedance tuner circuit 24. As previously described in FIG. 3, the measured input impedances $\Gamma_{IN-MEAS1}$-$\Gamma_{IN-MEASN}$ will each be associated with a respective one of one or more measurement error circles 36(1)-36(N), such as the measurement error circle 36 in FIG. 3.

Next in the process 100, the control circuit 28 makes one or more estimates (denoted as "$\Gamma_{ANT-EST1}$-$\Gamma_{ANT-ESTN}$") of the antenna impedance $\Gamma_{ANT}$ (referred interchangeably as "estimated antenna impedances" hereinafter) at the output 32 of the impedance tuner circuit 24 based on the measured input impedances $\Gamma_{IN-MEAS1}$-$\Gamma_{IN-MEAS}$ N, respectively (step 104). According to the previous discussion in FIG. 3, the estimated antenna impedances $\Gamma_{ANT-EST1}$-$\Gamma_{ANT-ESTN}$ are each associated with a respective one of one or more estimation error circles 40(1)-40(N), such as the estimation error circle 40 in FIG. 3.

Figure 5:
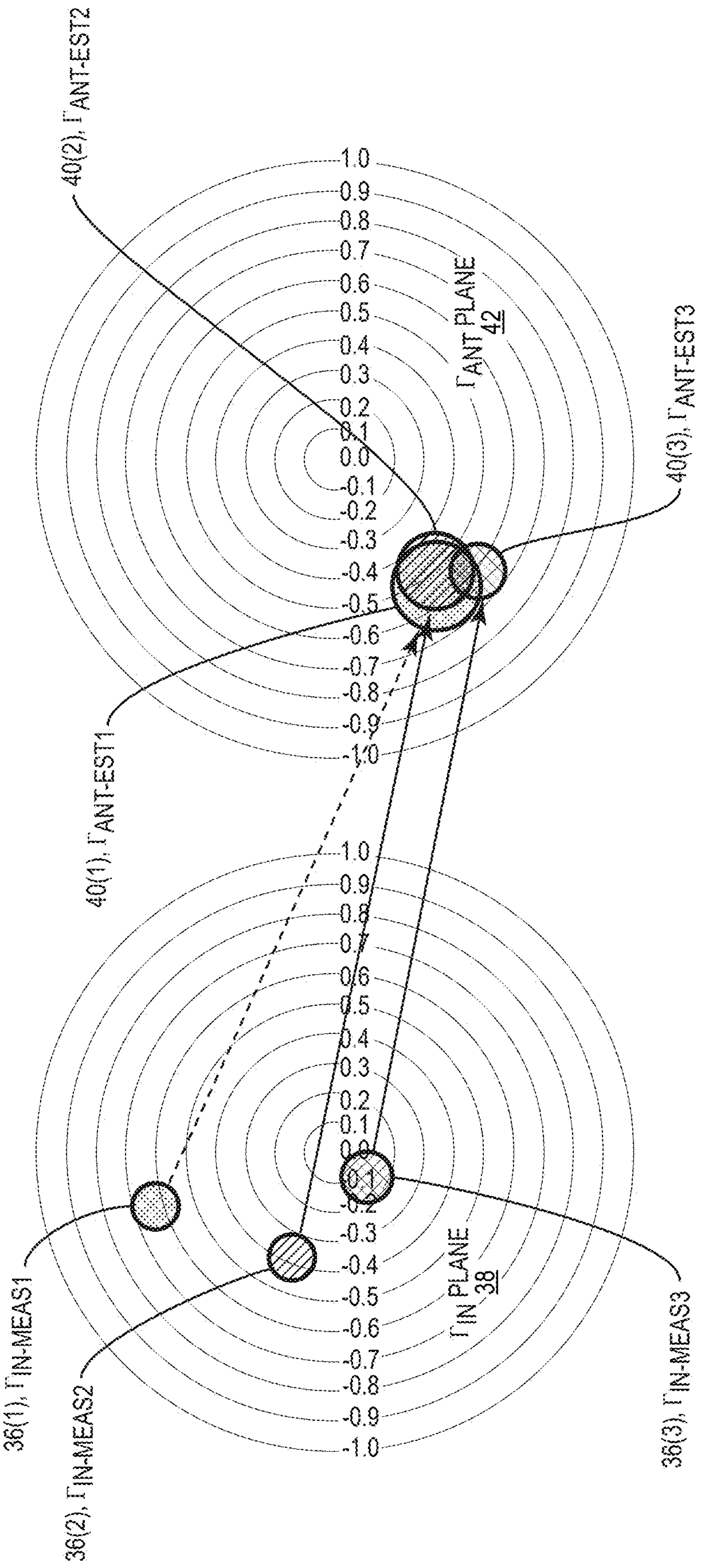
FIG. 5 is a graphic diagram providing an exemplary illustration of some steps in the process of FIG. 4 for estimating multiple antenna impedances based on multiple measured input impedances.

FIG. 5 is a graphic diagram providing an exemplary illustration of the steps 102 and 104 in the process 100 of FIG. 4. Common elements between FIGS. 3, 4, and 5 are shown therein with common element numbers and will not be re-described herein.

Herein, it is assumed that the impedance sensor 26 performs three measurements of the input impedance $\Gamma_{IN}$ to thereby produce three measured input impedances $\Gamma_{IN-MEAS1}$-$\Gamma_{IN-MEAS3}$ in association with three measurement error circles 36(1)-36(3), and the control circuit 28 makes three estimations of the antenna impedance $\Gamma_{ANT}$ to produce three estimated antenna impedances $\Gamma_{ANT-EST1}$-$\Gamma_{ANT-EST3}$ in association with three estimation error circles 40(1)-40(3). Understandably, the illustration provided in FIG. 5 is merely an example, which shall not be deemed as being limiting by any means.

Herein, each of the estimated antenna impedances $\Gamma_{ANT-EST1}$-$\Gamma_{ANT-EST3}$ is determined from a respective one of the measured input impedances $\Gamma_{IN-MEAS1}$-$\Gamma_{IN-MEAS3}$ in accordance with the algorithm described in FIG. 3. Accordingly, the control circuit 28 can be configured to average the estimated antenna impedances $\Gamma_{ANT-EST1}$-$\Gamma_{ANT-EST3}$ in search of a largest overlapping area among the estimation error circles 40(1)-40(3). In one embodiment, the control circuit 28 may determine a weighted average of the estimated antenna impedances $\Gamma_{ANT-EST1}$-$\Gamma_{ANT-EST3}$. In another embodiment, the control circuit 28 may select one of the estimated antenna impedances $\Gamma_{ANT-EST1}$-$\Gamma_{ANT-EST3}$ corresponding to a maximum likelihood value. In case more than one of the estimated antenna impedances $\Gamma_{ANT-EST1}$-$\Gamma_{ANT-EST3}$ has the same maximum likelihood value, an average of these estimated antenna impedances $\Gamma_{ANT-EST1}$-$\Gamma_{ANT-EST3}$ will be used. By performing multiple measurements of the input impedances $\Gamma_{IN-MEAS1}$-$\Gamma_{IN-MEAS3}$ and averaging the estimated antenna impedances $\Gamma_{ANT-EST1}$-$\Gamma_{ANT-EST3}$, it is possible to reduce random noise associated with each of the measured input impedances $\Gamma_{IN-MEAS1}$-$\Gamma_{IN-MEAS3}$.

With reference back to FIG. 4, the control circuit 28 then determines an optimum tuner state $TS_{OPT}$ among all the tuner states associated with the impedance tuner circuit 24 based on the estimated antenna impedances $\Gamma_{ANT-EST1}$-$\Gamma_{ANT-ESTN}$ (step 106). Herein, the control circuit 28 is configured to select the optimum tuner state $TS_{OPT}$ from all the tuner states associated with the impedance tuner circuit 24 based on the average of the estimated antenna impedances $\Gamma_{ANT-EST1}$-$\Gamma_{ANT-EST3}$. In an embodiment, the control circuit 28 may use a tuner model (e.g., an s-parameter model) of the transfer function of the impedance tuner circuit 24 to determine the optimum tuner state $TS_{OPT}$.

Figure 6:
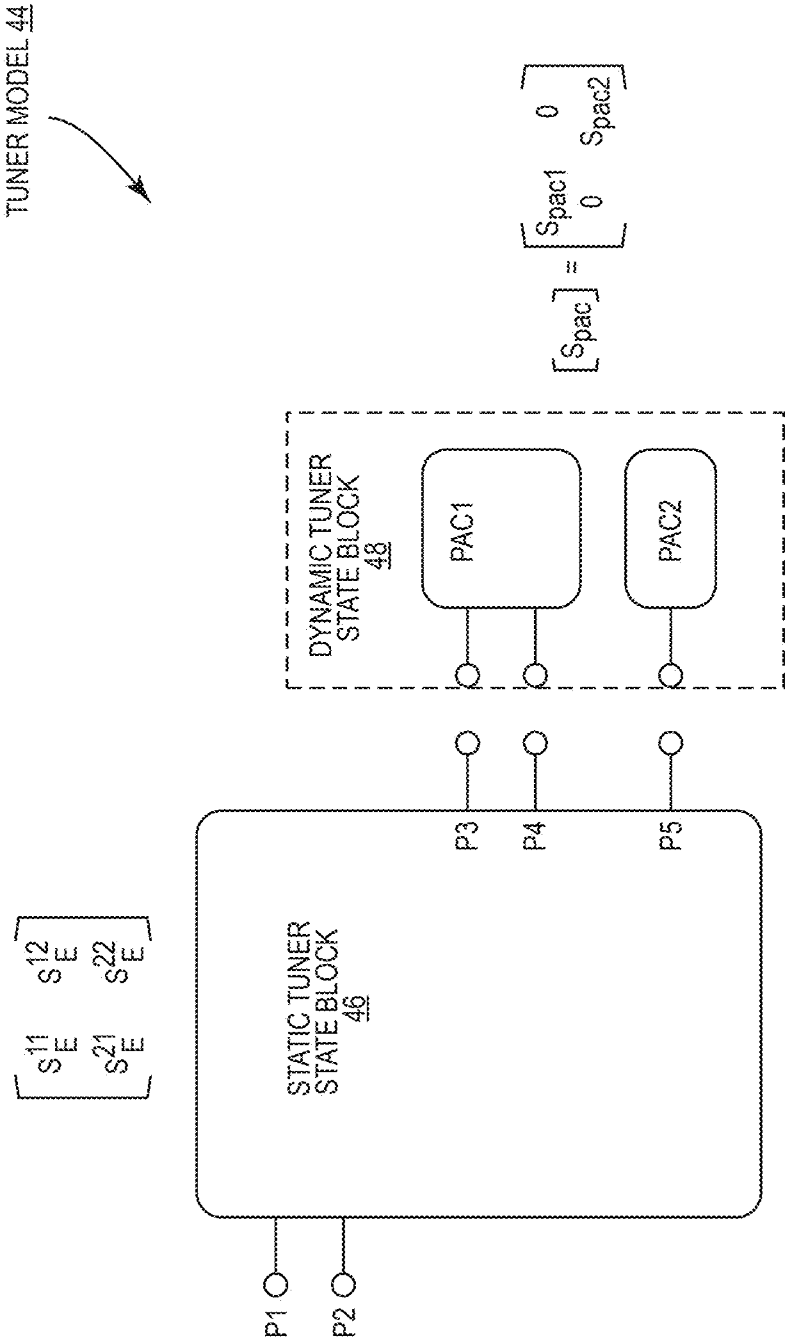
FIG. 6 is a block diagram illustrating a tuner model that can be dynamically defined by the antenna tuning circuit of FIG. 2 for determining an optimum tuner state.

Notably, the impedance tuner circuit 24 can be associated with thousands of tuner states, which can consume a large amount of storage space for storing these tuner states. As such, it is desirable that the tuner model can be so defined to determine the optimum tuner state $TS_{OPT}$ without consuming a large amount of the storage space. In this regard, FIG. 6 is a block diagram illustrating a tuner model 44 that can be dynamically defined by the control circuit 28 in the antenna tuning circuit 12 of FIG. 2 for determining the optimum tuner state $TS_{OPT}$.

According to an embodiment of the present disclosure, the tuner model 44 includes a static tuner state block 46 and a dynamic tuner state block 48. The dynamic tuner state block 48 may be further divided into a pair of programmable automation controller (PAC) blocks PAC1 and PAC2. In a non-limiting example, the static tuner state block 46 and the dynamic tuner state block 48 can each be modeled by a 5-port network as expressed in equations (Eq. 4.1 and 4.2).

$$[S_E] = \begin{bmatrix} S_E^{11} & S_E^{12} \\ S_E^{21} & S_E^{22} \end{bmatrix} \quad \text{(Eq. 4.1)}$$

$$[S_{PAC}] = \begin{bmatrix} S_{PAC1} & 0 \\ 0 & S_{PAC2} \end{bmatrix} \quad \text{(Eq. 4.2)}$$

In a non-limiting example, the static tuner state block 46 only needs to store 15 complex numbers, while the PAC blocks PAC1 and PAC2 will store 96 and 48 complex numbers, respectively. Thus, the tuner model 44 will store a total of 159 complex numbers. In contrast, a conventional tuner model with 5-bit PAC1 and 4-bit PAC2 will have to store 1536 complex numbers. In this regard, the tuner model 44 can save approximately 90% of storage space compared to the conventional tuner model.

Based on the static tuner state model in equation (Eq. 4.1) and the dynamic tuner state model in equation (Eq. 4.2), a 2-port tuner state model [S] of the impedance tuner circuit 24 can be determined as in equation (Eq. 5) below.

$$[S]=S_E^{11}+S_E^{12}*(I_3-[S_{PAC}]*S_E^{22})^{-1}*[S_{PAC}]*S_E^{21} \quad \text{(Eq. 5)}$$

Notably, the highest matrix order is 3, which is the same as the number of connections in the tuner model 44. The control circuit 28 is then configured to select the optimum tuner state $TS_{OPT}$ among the static and/or dynamic tuner states stored in the tuner model 44. In one embodiment, the tuner model 44 may be predetermined and prestored in the control circuit 28. Alternatively, the control circuit 28 may generate the tuner model 44 dynamically.

Figure 7:
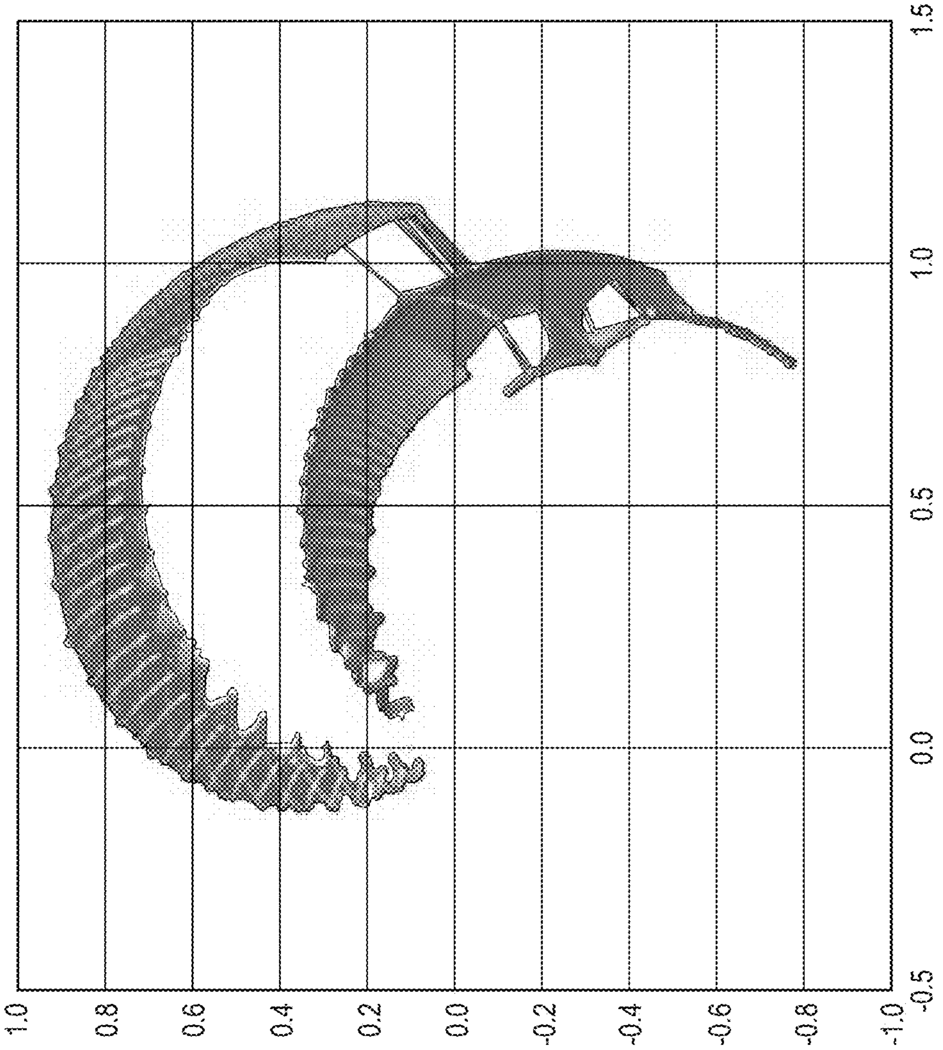
FIG. 7 is a graphic diagram illustrating an exemplary complex tuner transfer function that can be controlled to reduce amplitude and phase disturbance during tuner state transition.

With reference back to FIG. 4, after determining the optimum tuner state $TS_{OPT}$, the control circuit 28 can adjust the impedance tuner circuit 24 based on the determined optimum tuner state $TS_{OPT}$ to thereby match the antenna impedance (step 108). Notably, changing the impedance tuner circuit 24 to the optimum tuner state $TS_{OPT}$ may introduce disturbance (e.g., amplitude and/or phase alteration) in the RF transmit signal 18. As such, it is desirable to control magnitude and phase disturbance in the RF transmit signal 18 when changing the impedance tuner circuit 24 from one tuner state to another. In this regard, FIG. 7 is a graphic diagram illustrating an exemplary complex tuner transfer function 50 of the impedance tuner circuit 24 in FIG. 2 that can be controlled to reduce amplitude and phase disturbance when the impedance tuner circuit 24 transitions from one tuner state to another.

With respect to transmitting the RF transmit signal 18, the complex tuner transfer function 50 controls both magnitude and phase of antenna radiated power. In accordance with the reciprocal principle, the complex tuner function 50 can also control magnitude and phase of antenna received power. For a general 2-port network, the transfer function can be written as in equation (Eq. 6).

$$G_T = \frac{1-\Gamma_S}{1-\Gamma_S\Gamma_{IN}} \times \frac{S_{21}}{1-S_{22}\Gamma_{ANT}} \quad \text{(Eq. 6)}$$

For a matched source $\Gamma_S=0$, the transfer function in equation (Eq. 6) can be rewritten as in equation (Eq. 7) below.

$$G_T = \frac{S_{21}}{1-S_{22}\Gamma_{ANT}} \quad \text{(Eq. 7)}$$

For any given antenna impedance $\Gamma_{ANT}$, possible complex transfer function values $G_{Tn}$ ($1 \leq n \leq N$) can be calculated at the tuner states $TS_1$-$TS_N$. As an example, when the impedance tuner circuit 24 changes from tuner state $TS_1$ to tuner state $TS_2$, a ratio between the complex transfer function values $GT_1/GT_2$ will determine the change in the antenna radiated power or the antenna received power. Specifically, magnitude and phase change of the antenna radiated/received power can be expressed in equations (Eq. 8.1 and 8.2) below.

$$\text{Magnitude Change} = \left|\frac{GT_2}{GT_1}\right| \quad \text{(Eq. 8.1)}$$

$$\text{Phase Change} = \text{phase}\left(\frac{GT_2}{GT_1}\right) \quad \text{(Eq. 8.2)}$$

By limiting the change of $GT_2/GT_1$, it is thus possible to limit the change of the antenna radiated/received power. In an embodiment, it is possible to limit the magnitude change in decibel (dB) and the phase change in phase change magnitude. Notably, the magnitude change in dB and the absolute phase change will remain the same when the impedance tuner circuit 24 changes from tuner state $TS_1$ to $TS_2$, and vice versa.

By going through all possible combinations of the tuner states $TS_1$-$TS_N$, a unidirectional graph can be built, with all the edges following a magnitude and phase control limit, as expressed in equations (Eq. 9.1 and 9.2).

$$\text{dB}\left|\frac{GT_2}{GT_1}\right| < \text{max dB change} \quad \text{(Eq. 9.1)}$$

$$\left|\text{phase}\left(\frac{GT_2}{GT_1}\right)\right| < \text{mad phase change} \quad \text{(Eq. 9.2)}$$

After building the complex tuner transfer function 50 shown in FIG. 7, a standard path search algorithm may be used to find a path between any two of the tuner states $TS_1$-$TS_N$. Instead of moving one tunable component (e.g., tunable capacitor/resistor/inductor) per step, the algorithm takes all involved tunable components in the impedance tuner circuit 24 into consideration.

With reference back to FIG. 4, after adjusting the impedance tuner circuit 24 to the optimum tuner state, the control circuit 28 then checks to see whether exit criteria have been met (step 110). In a non-limiting example, the exit criteria can correspond to a highest power for an input match at or below a predefined voltage standing wave ratio (VSWR). The process 100 will return to step 102 if the exit criteria has not been met. Otherwise, the control circuit 28 will check whether on-hold criteria are met (step 112). In a non-limiting example, the on-hold criteria are met when a maximum likelihood value of the estimated antenna impedances $\Gamma_{ANT\text{-}EST1}$-$\Gamma_{ANT\text{-}ESTN}$ is above a threshold or remains relatively constant. If the on-hold criteria are met, the antenna tuning circuit 12 will enter an on-hold mode (step 114). Otherwise, the process 100 will return to step 102.

With reference back to FIG. 2, in an embodiment, the antenna tuning circuit 12 may include a second impedance sensor 52 provided between the output 32 of the impedance tuner circuit 24 and the antenna port 14. Like the impedance sensor 26, the second impedance sensor 52 can also measure forward and reverse power to enable a calculation of loss in the impedance tuner circuit 24. In this regard, the second impedance sensor 52 may also be capable of measuring magnitude and/or phase of the reflection coefficient.

The second impedance sensor 52 may also be used to help the control circuit 28 to improve estimations of the antenna impedance $\Gamma_{ANT\text{-}EST1}$-$\Gamma_{ANT\text{-}ESTN}$ as well as the measurements of the input impedances $\Gamma_{IN\text{-}MEAS1}$-$\Gamma_{IN\text{-}MEASN}$ by combining expected error regions of these measurements.

Figure 8:
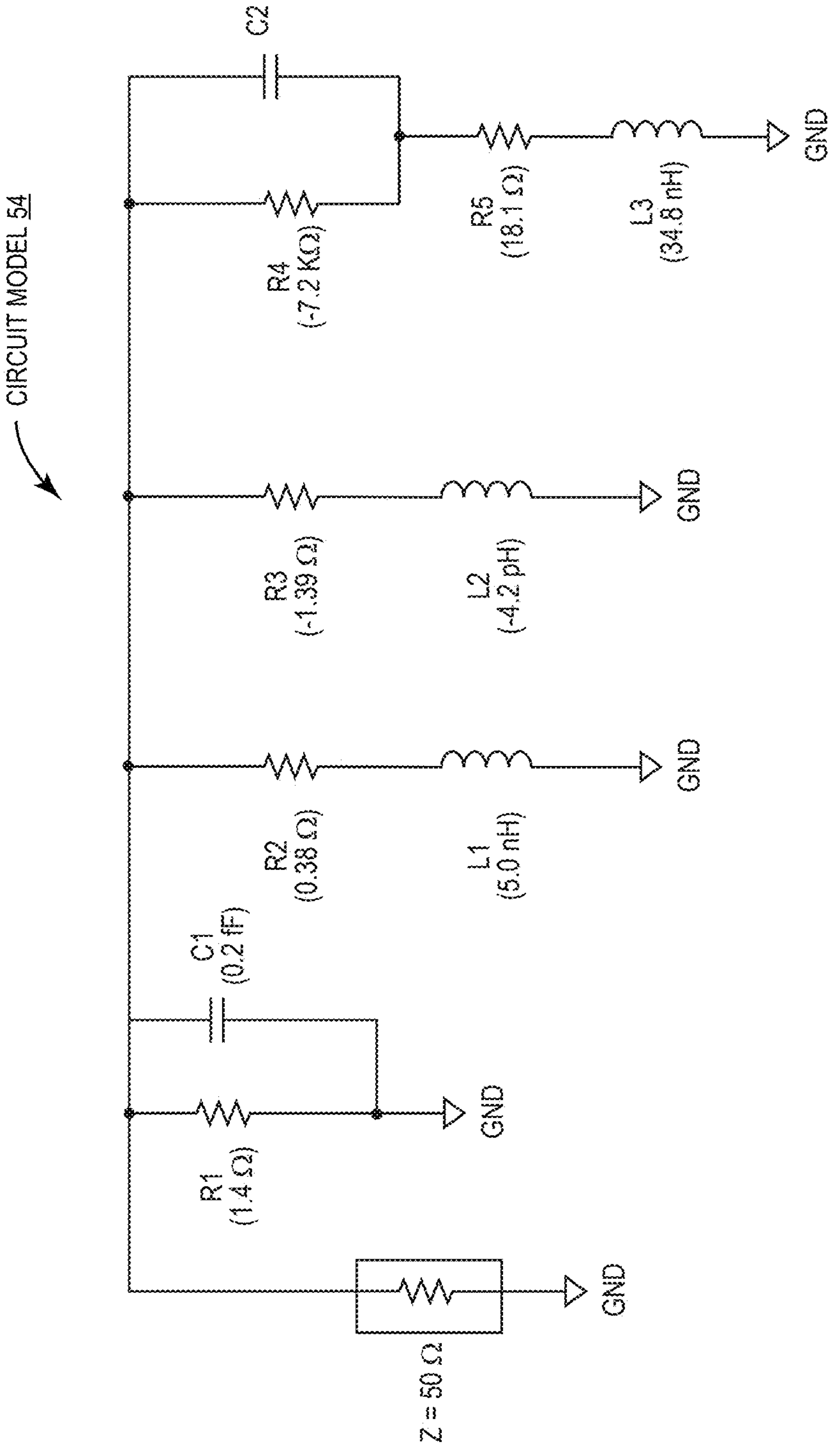
FIG. 8 is a schematic diagram of an exemplary circuit that models antenna impedance at selected transmitting and receiving bands.

Notably, the antenna impedance $\Gamma_{ANT}$ can only be measured by the impedance sensor 26 and/or the second impedance sensor 52 at transmitting frequencies. However, it is equally important to determine the antenna impedance $\Gamma_{ANT}$ at receiving frequencies to improve overall performance of the wireless device. In this regard, FIG. 8 is a schematic diagram of an exemplary circuit model 54 that models the antenna impedance $\Gamma_{ANT}$ at selected transmitting and receiving bands.

As an example, the circuit model 54 can be used to model the antenna impedance $\Gamma_{ANT}$ at the following transmitting and receiving frequency bands.

| Band | Transmitting Frequency | Receiving Frequency |
|---|---|---|
| B13 | 777 MHz | 746 MHz |
| | 787 MHz | 756 MHz |
| B5 | 824 MHz | 869 MHz |
| | 849 MHz | 894 MHz |

-continued

| Band | Transmitting Frequency | Receiving Frequency |
|---|---|---|
| B8 | 880 MHz<br>915 MHz | 925 MHz<br>960 MHz |

Among the transmitting and receiving frequencies in the above table, the receiving frequencies in B13 and B8 are not measurable by the impedance sensor 26 and/or the second impedance sensor 52. As such, it is necessary to extrapolate the antenna impedance $\Gamma_{ANT}$ at the receiving frequencies in B13 and B8.

Notably, the antenna impedance $\Gamma_{ANT}$ and reflection coefficient versus frequency are periodical and of infinite degrees. However, in a limited frequency range, a rational approximation, which may be transferred to an L-C-R circuit model like the circuit model 54, can be achieved by such methods as a vector-fitting method, a singular value decomposition (SVD) method, an Levenberg-Marquardt method, and so on.

Figure 9:
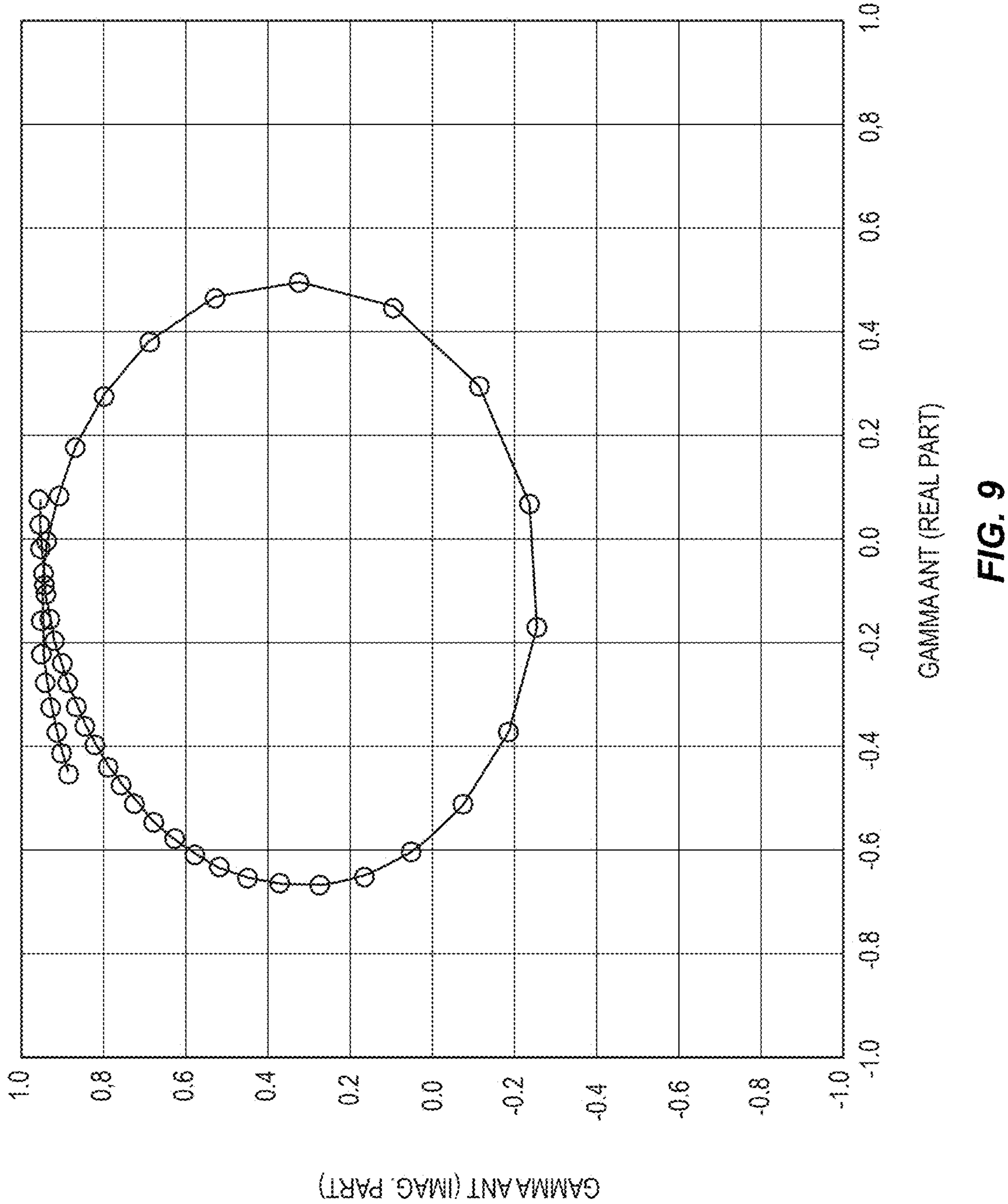
FIG. 9 is a graphic diagram providing an exemplary illustration of a fifth-order rational function.

When the antenna has a full measurement over the frequency range, the approximation is usually the least error fitting in the whole frequency range. For a certain type of antenna, there is a minimum order of the rational function to achieve a reasonable least error. As an example, FIG. 9 is a graphic diagram illustrating a fifth-order rational function fitting a planar inverted-F antenna (PIFA) antenna from 650 MHz to 1.2 GHz. Herein, the rational function can be expressed in equation (Eq. 10) below.

$$\Gamma_{ANT}(s) = -0.0422 + \frac{-1.2536e^{10}}{s + 9.5488e^{9}} + \left(\frac{3.2501e^{8} - 4.1124e^{8}i}{s + 0.3818e^{9} - 5.3485e^{9}i} + \frac{3.2501e^{8} + 4.1124e^{8}i}{s + 0.3818e^{9} + 5.3485e^{9}i}\right) + \left(\frac{3.0871e^{9} - 1.8568e^{8}i}{s + 1.9905e^{9} + 9.0751i} + \frac{3.0871e^{9} + 1.8568e^{8}i}{s + 1.9905e^{9} + 9.0751i}\right) \tag{Eq. 10}$$

The rational function $\Gamma_{ANT}$(s) can be easily transferred to the circuit model 54 of FIG. 8. Note that, in FIG. 8, there are negative resistors in the circuit model 54. The passivity of the antenna is only guaranteed in the 650 MHz to 1.2 GHz frequency range.

Figure 10:
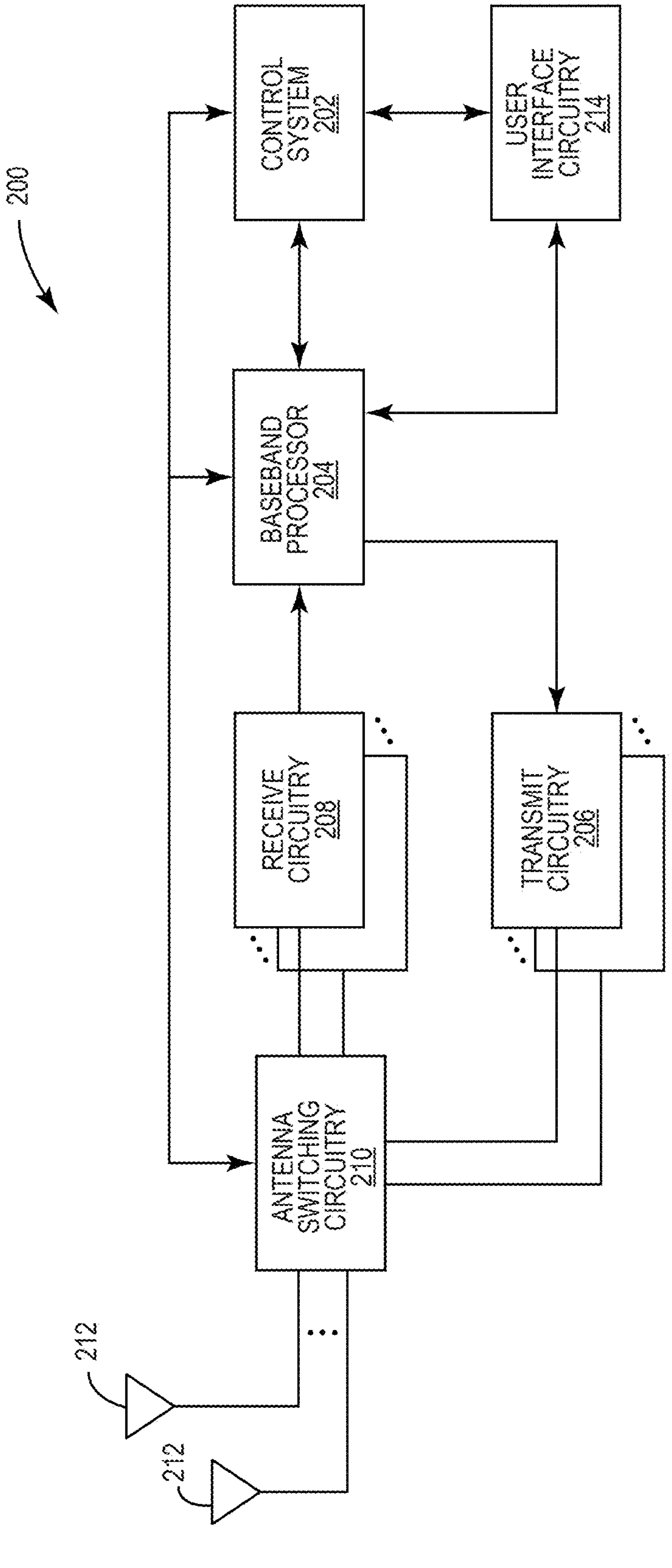
FIG. 10 is a schematic diagram of an exemplary user element wherein the antenna tuning circuit in FIG. 2 can be provided to perform closed loop antenna tuning.

The antenna tuning circuit 12 in FIG. 2 can be provided in a user element to enable closed loop antenna tuning according to embodiments described above. In this regard, FIG. 10 is a schematic diagram of an exemplary user element 200 wherein the antenna tuning circuit 12 in FIG. 2 can be provided.

Herein, the user element 200 can be any type of user elements, such as mobile terminals, smart watches, tablets, computers, navigation devices, access points, and like wireless communication devices that support wireless communications, such as cellular, wireless local area network (WLAN), Bluetooth, and near field communications. The user element 200 will generally include a control system 202, a baseband processor 204, transmit circuitry 206, receive circuitry 208, antenna switching circuitry 210, multiple antennas 212, and user interface circuitry 214. In a non-limiting example, the control system 202 can be a field-programmable gate array (FPGA), as an example. In this regard, the control system 202 can include at least a microprocessor(s), an embedded memory circuit(s), and a communication bus interface(s). The receive circuitry 208 receives radio frequency signals via the antennas 212 and through the antenna switching circuitry 210 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using analog-to-digital converter(s) (ADC).

The baseband processor 204 processes the digitized received signal to extract the information or data bits conveyed in the received signal. This processing typically comprises demodulation, decoding, and error correction operations, as will be discussed in greater detail below. The baseband processor 204 is generally implemented in one or more digital signal processors (DSPs) and application specific integrated circuits (ASICs).

For transmission, the baseband processor 204 receives digitized data, which may represent voice, data, or control information, from the control system 202, which it encodes for transmission. The encoded data is output to the transmit circuitry 206, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission, and deliver the modulated carrier signal to the antennas 212 through the antenna switching circuitry 210. The multiple antennas 212 and the replicated transmit and receive circuitries 206, 208 may provide spatial diversity. Modulation and processing details will be understood by those skilled in the art.

Those skilled in the art will recognize improvements and modifications to the preferred embodiments of the present disclosure. All such improvements and modifications are considered within the scope of the concepts disclosed herein and the claims that follow.

What is claimed is:

1. An antenna tuning circuit comprising:

an impedance tuner circuit coupled to an antenna port; and a control circuit configured to:

receive one or more input impedances measured at an input of the impedance tuner circuit, each of the one or more measured input impedances corresponding to a respective one of one or more selected tuning states among a plurality of tuning states associated with the impedance tuner circuit;

make one or more estimates of an antenna impedance presenting at the antenna port based on the one or more measured input impedances, respectively;

determine an optimum tuning state among the plurality of tuning states based on the one or more estimates of the antenna impedance; and configure the impedance tuner circuit based on the determined optimum tuning state to thereby match the antenna impedance presenting at the antenna port.

2. The antenna tuning circuit of claim 1, further comprising an impedance sensor coupled to the input of the impedance tuner circuit and configured to measure the one or more input impedances each corresponding to the respective one of the one or more selected tuning states.

3. The antenna tuning circuit of claim 2, further comprising a second impedance sensor coupled between an output of the impedance tuner circuit and the antenna port, the second impedance sensor is configured to measure a power loss at the antenna port to thereby enable the control circuit to optimize the determined optimum tuning state.

4. The antenna tuning circuit of claim 2, wherein:

the impedance sensor is further configured to measure the one or more input impedances at one or more transmitting frequencies, respectively; and the control circuit is further configured to make the one or more estimates of the antenna impedance at the one or more transmitting frequencies, respectively.

5. The antenna tuning circuit of claim 4, wherein the control circuit is further configured to extrapolate one or more receiving impedances at one or more receiving frequencies falling outside a measurement range of the impedance sensor.

6. The antenna tuning circuit of claim 1, wherein the one or more estimates of the antenna impedance each corresponds to a respective one of one or more error distribution circles each comprising:

a center corresponding to a respective one of the one or more estimates of the antenna impedance; and a radius corresponding to a respective error vector magnitude (EVM).

7. The antenna tuning circuit of claim 1, wherein the control circuit is further configured to determine the optimum tuning state among the plurality of tuning states based on an average of the one or more estimates of the antenna impedance.

8. The antenna tuning circuit of claim 1, wherein the control circuit is further configured to control a transfer function of the impedance tuner circuit to limit a magnitude and/or a phase change in a transmit power delivered to the antenna port and/or a receive power received via the antenna port.

9. The antenna tuning circuit of claim 1, wherein the control circuit is further configured to determine the optimum tuning state based on an impedance tuner model comprising a static tuner state block and a dynamic tuner state block comprising a pair of programmable automation controller (PAC) blocks.

10. A method for performing closed loop antenna tuning comprising:

measuring one or more input impedances each corresponding to a respective one of one or more selected tuning states among a plurality of tuning states;

making one or more estimates of an antenna impedance based on the one or more measured input impedances, respectively;

determining an optimum tuning state among the plurality of tuning states based on the one or more estimates of the antenna impedance; and matching the antenna impedance based on the determined optimum tuning state.

11. The method of claim 10, further comprising measuring the one or more input impedances in one or more measurement error circles based on one or more selected tunning states, respectively.

12. The method of claim 11, further comprising making the one or more estimates of the antenna impedance in one or more estimation error circles based on the one or more measured input impedances, respectively.

13. The method of claim 12, further comprising:

measuring the one or more input impedances at one or more transmitting frequencies, respectively; and making the one or more estimates of the antenna impedance at the one or more transmitting frequencies, respectively.

14. The method of claim 13, further comprising extrapolating one or more receiving impedances at one or more receiving frequencies.

15. The method of claim 12, wherein each of the one or more estimation error circles corresponds to a respective one of one or more error distribution circles each comprising:

a center corresponding to a respective one of the one or more estimates of the antenna impedance; and a radius corresponding to a respective error vector magnitude (EVM).

16. The method of claim 12, further comprising averaging the one or more estimates of the antenna impedance to thereby reduce random noise associated with each of the one or more estimates of the antenna impedance.

17. The method of claim 10, further comprising determining the optimum tuning state based on an average of the one or more estimates.

18. The method of claim 10, further comprising determining the optimum tuning state based on a tuner model comprising a static tuner state block and a dynamic tuner state block comprising a pair of programmable automation controller (PAC) blocks.

19. The method of claim 10, further comprising optimizing the determined optimum tuning state based on a measured power loss.

20. The method of claim 10, further comprising limiting a magnitude and/or a phase change in a transmit power and/or a receive power.

* * * * *